No. 639,462. Patented Dec. 19, 1899.
G. S. THOMPSON.
COUPLING FOR WHIFFLETREES.
(Application filed Sept. 26, 1898.)
(No Model.)
Fig. 1.
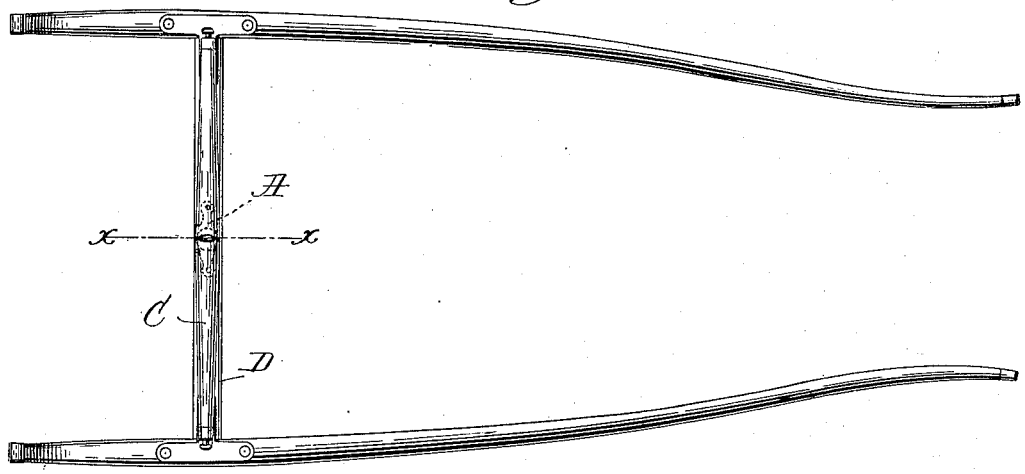
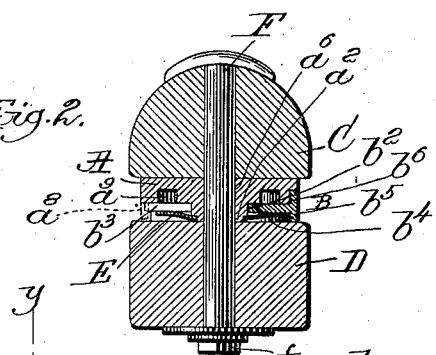
Fig. 2.
Fig. 3.
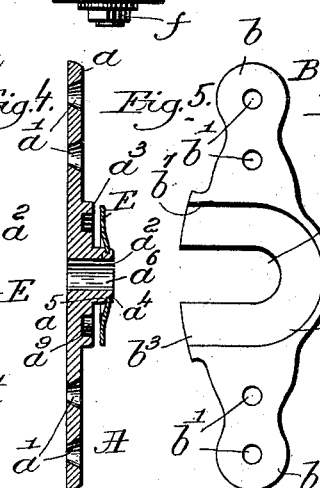
Fig. 4.
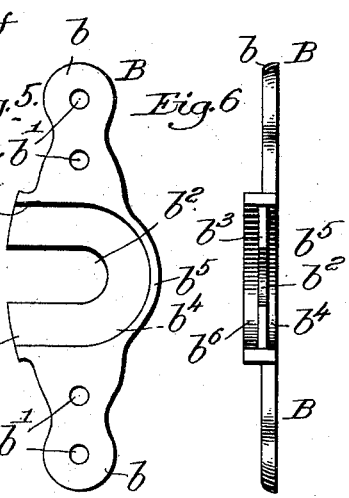
Fig. 5. Fig. 6.
Witnesses:
Fred S. Greenleaf
James M. Urquhart
Inventor
George S. Thompson,
by Crosby & Gregory
Attys.
THE NORRIS PETERS CO., PHOTO-LITHO., WASHINGTON, D. C.

UNITED STATES PATENT OFFICE.

GEORGE S. THOMPSON, OF EPPING, NEW HAMPSHIRE.

COUPLING FOR WHIFFLETREES.

SPECIFICATION forming part of Letters Patent No. 639,462, dated December 19, 1899.

Application filed September 26, 1898. Serial No. 691,854. (No model.)

*To all whom it may concern:*

Be it known that I, GEORGE S. THOMPSON, of Epping, county of Rockingham, State of New Hampshire, have invented an Improvement in Couplings for Whiffletrees or the Like, of which the following description, in connection with the accompanying drawings, is a specification, like letters on the drawings representing like parts.

Whiffletree-couplings are open commonly to the objection that they wear loose rapidly, with a consequent annoying tendency to rattle and a dangerous liability to pull apart under a sudden strain.

Antirattling devices have been provided; but the life of these has been short, uniformly, from the nature of the material when made of rubber or the like, but more particularly from the manner of their application, inasmuch as it has been the custom to interpose the antirattling device between and tending to force apart the members of the coupling, thus aiding to promote ultimately the very evil to prevent which antirattling devices are provided.

Accordingly my present invention has for its object an improved manner and means for connecting coupling members of this class, characterized by provision for maintaining the members under a steady draft toward each other instead of a disruptive strain, the means to accomplish this being preferably of such a character as to equal the coupling members themselves in permanence.

The various features of my invention will be fully illustrated in the accompanying drawings, described in the specification, and set forth in the claims.

In the drawings, Figure 1 is a plan view of a pair of shafts to which a coupling embodying my improved construction has been applied. Fig. 2 is a vertical transverse section of the same on the line $x\,x$, Fig. 1. Fig. 3 is a view in plan looking from the bottom of what is shown as the upper coupling member in Fig. 2. Fig. 4 is a sectional view taken on the line $y\,y$, Fig. 3, looking from left to right. Fig. 5 is a plan view looking from bottom to top of the lower coupling member, Fig. 2. Fig. 6 is a view in elevation of the member shown in Fig. 5 looking from left to right.

In the coupling which I have selected for illustration and description as a convenient embodiment of my invention the members A B are shown as of the form which has been proved convenient after long usage in devices of this class, although any suitable contour may be followed and various changes in shape may be made, especially to adapt the coupling to other use than as a whiffletree-coupling.

In the form illustrated the coupling members are respectively provided with flat extensions $a\,b$, arranged suitably, as at $a'\,b'$, to receive suitable fastening devices, by which they may be attached to the whiffletree C and to the shaft-bolster D, respectively, in usual or desired manner.

In carrying out the chief object of my invention, which, as already stated, is to provide for maintaining the members under a steady draft toward each other, I have furnished the member A with a post, hub, or projection $a^2$, preferably hollow and located centrally in the body of the member. This projection is designed to pass through the body of the other member B of the coupling, which in the form illustrated is provided with an aperture $b^2$ at or near the center of the member, the construction illustrated taking a slot-like form, the open end of which will extend toward the rear of the shafts, as indicated in Fig. 2. Suitable means will be provided to retain the members in coupled relation, one convenient form of such means E being illustrated as a spring-disk secured in any suitable manner to the projection $a^2$ of the member A and adapted to permit the entrance of the portion $b^3$ of the member D between it (the disk) and the body $a^3$ of the member A, the portion $b^3$ being embraced tightly between the body $a^3$ and the disk, so that the members are held together under a constant pressure, and axial separation of the same is prevented under any circumstances so long as the disk remains attached to the member A. While any suitable means of securing this attachment may be adopted, I have found a practical and cheap means to be secured by swaging the head $a^4$ of the projection $a^2$ over upon the disk, which latter is provided with a central aperture of sufficient diameter to receive the projection as a snug fit, while the projection may be and preferably is provided with a shoulder $a^5$ to maintain the disk at a suitable distance from the body $a^3$ to permit ready entrance of the portion $b^3$ of the member B. When said portion $b^3$ takes the form of a flat web, as illustrated, and as it may be formed conveniently, and when the aperture $b^2$ is formed as a slot extending rearwardly, as already described, the coupling members A B may be attached, respectively, to the whiffletree C and to the bolster D before they are assembled, the member A being attached so that the projection $a^2$ extends downwardly and the member B with its slot $b^2$ extended in a rearward direction.

The disk E is preferably secured in place on the member A at the time of manufacture, so that all that is necessary when the coupling members have been secured to their respective parts is to approach the whiffletree to the bolster from the rear in such a manner that the projection $a^2$ will come opposite the rear end of the slot $b^2$ and the disk E will enter below the body portion $b^3$. The whiffletree being pulled forward, the members will assume the position shown clearly in Fig. 2, after which a bolt F of the ordinary type may, if desired, be inserted and secured in place by a usual nut $f$, the bolt passing through the central aperture $a^6$ in the member A, as will be readily understood.

The bolt F will of course by my invention be relieved of the greater part of the strain to which it is subject in ordinary constructions; but should the nut $f$ work off or even should the bolt itself break it will be seen, readily, that the retaining member E, both by its resiliency when formed of spring material, but more particularly by the manner of attachment when of the preferred form illustrated, will resist in the most effective manner possible disruption of the coupling, since the strain will come adjacent the central region of attachment of the disk to the projection $a^2$, where the displacing-leverage is least powerful. Furthermore, the slot $b^2$ having its opening directed toward the rear, even though the bolt F be absent, the projection $a^2$ would merely be drawn more firmly into the slot and the members of the coupling would be held together and accidental displacement prevented until the next inspection of the parts would reveal the condition of the coupling. Thus in addition to its normal function of an antirattling device my improved device is designed to present an effective guard against a form of accident not uncommon and having its source in the disruption of the whiffletree-coupling with consequent detachment of the whiffletree and its fall upon the horse's heels.

The operation of the coupling members will be obvious from the illustration, particularly from Fig. 2, which shows the disk E seated within the chamber-like recess $b^4$ of the member B beneath the body portion $b^3$, which is preferably in the form of a relatively thin web, as shown, the material of the member being extended around in front, preferably as shown, in a flange-like curved wall $b^5$, while the recess is open at the rear and has substantially straight walls at $b^7$ to permit entrance of the disk or retaining member E. Preferably the material of the member B will be extended beyond the web portion $b^3$ to form a similar recess $b^6$ to receive the rounded body or hub $a^3$ of the member A, the latter being shown as cut away at $a^9$ for the sake of lightness, cheapness, and to save friction. This annular recess may be utilized for a receptacle for lubricating purposes, if used and if it be so desired.

The retaining member E may vary considerably in form, but is preferably dished inwardly toward the member B, as indicated, and then slightly flattened at its periphery, as illustrated, to furnish a rather wide bearing-surface at said periphery, so that it will not cut into the material of the portion $b^3$ of the member B.

The retaining member E may be of any suitable material, but preferably is stamped up from sheet metal and then tempered. In Fig. 3 it is broken away slightly at $e'$ to reveal the annular recess $a^9$ in the member A.

I have shown on the member A a wing-like arrangement $a^7$ on each side of the center of the body portion, which serves to close the rear of the aperture or recess $b^6$ and keep out dust or other foreign matter; but this may be used or not, as found necessary or desirable, and, if preferred, its extent may be sufficient to close the rear end of the recess $b^4$, as indicated in dotted lines $a^8$ in Fig. 2.

As already indicated, the contour of the aperture $b^2$ need not take the form of an open slot, but the retaining means E may be attached to the projection $a^2$ after assemblage of the members A B, and it is further contemplated that the aperture $a^6$ in the member A may be omitted if use is not made of a bolt F. The said bolt would obviously be unnecessary in many instances where the strain upon the coupling would be light, for I wish it clearly understood that my invention is by no means limited to its illustrated embodiment in a whiffletree-coupling, but I wish to cover its application in the construction of any coupling or equivalent device where the improvement disclosed may be of use.

By the use of the terms "coupling" and "coupling members" in the specification and claims it will be understood that I refer not to the articles to be coupled, as the whiffletree C and bolster D, but to the parts of the coupling proper, as the parts A B.

In general the construction and arrangement of parts may be varied considerably from the form illustrated without departing from the spirit of my invention.

Having described my invention, what I claim as new, and desire to secure by Letters Patent, is—

1. In a coupling for whiffletrees or the like, a pair of coupling members coöperating substantially in the manner set forth and means intermediate and acting to draw said members constantly toward each other when in coupled relation.

2. In a coupling of the class described; a coupling member having a body-aperture; a coöperating coupling member provided with a hub or projection adapted to traverse said aperture; and means adapted to be secured to said projection and to maintain said coupling members under constant draft toward each other.

3. In a coupling of the class described, the combination with a pair of coupling members coöperating substantially in the manner set forth, of a disk-spring intermediate and adapted to draw said members together constantly.

4. In a coupling of the class described; a coupling member having a web-like body portion provided with a central aperture; a coöperating coupling member, having a hub or projection extended from its body and adapted to traverse said aperture; and a spring-disk adapted to be secured at its center to said projection and to contact at its free portion with said web-like body portion, said portion being embraced firmly between said spring and said coöperating coupling member.

5. In a coupling of the class described; a coupling member having a medial slot-like aperture; and a coöperating coupling member having a hub or projection provided near its head with a resilient retaining member; said projection being adapted to enter said slot when said members are assembled slidingly, to enable said slotted member to be interposed and embraced firmly between said retaining member and said coöperating member.

6. The combination with a plurality of articles to be coupled; of a coupling member secured to one of said articles, and a coöperating coupling member secured to another; one of said members having a hub or projection provided with a resilient retaining member; and the other of said coupling members being slotted or recessed to permit the entrance of said projection and retaining member, and the assemblage of said members in coupled relation after attachment to said articles.

7. The combination with a whiffletree and its supporting-bolster; of a coupling member secured to the former, and a coöperating coupling member secured to the latter; one of said members having a hub or projection provided with a resilient retaining member; and the other of said coupling members being slotted or recessed to permit the entrance of said projection and retaining member, and the assemblage of said members in coupled relation after attachment to said whiffletree and bolster; said whiffletree, bolster and hub or projection being pierced to receive the usual, or a suitable, retaining-bolt.

8. The combination with a coupling member having a body-aperture and a coöperating coupling member having a hub or projection adapted to traverse said aperture, of an annulus or disk of spring material adapted to receive said projection centrally and be attached thereto, said spring being dished to approach nearer said coöperating member peripherally than centrally, the periphery of said spring-disk being arranged to engage with said apertured member in a flat annular region of contact.

9. The combination with a coupling member of the class described, having a hub or projection, of an annulus of spring material carried by said projection, the head of the latter being upset to retain said annulus in place.

10. A spring of the class described, consisting of a disk or annulus of resilient material, having a central attaching-aperture, the intermediate body portion of said annulus being dished, and its periphery flattened to form a bearing-surface.

11. The combination with a coupling member of the class described having a recess open at one side, of a coöperating coupling member having a body portion adapted to enter said recess and provided with a wing, flange or shoulder adapted to serve as a closure for said open side of said recess, substantially as described.

12. In a coupling of the class described, a coupling member having a body-recess $a^9$ adapted to serve as a receptacle for lubricating material and open throughout its extent on the side adjacent the coöperating coupling member, substantially as described.

In testimony whereof I have signed my name to this specifiation in the presence of two subscribing witnesses.

GEORGE S. THOMPSON.

Witnesses:
 E. W. LYND,
 CHARLES W. SANBORN.